Patented Feb. 10, 1931

1,791,941

UNITED STATES PATENT OFFICE

KARL T. STEIK, OF ELIZABETH, NEW JERSEY, ASSIGNOR TO STANDARD OIL DEVELOPMENT COMPANY, A CORPORATION OF DELAWARE

PROCESS FOR THE PURIFICATION OF PETROLEUM OILS

No Drawing. Application filed August 30, 1928. Serial No. 303,113.

The present invention relates to the art of purifying petroleum oils and more specifically comprises an improved method for treating distillates and the like. My invention will be fully understood from the following description.

In the treatment or purification of petroleum oils, shale oils and the like, wide use has been made of sulphuric acid and also of fuming sulphuric acid which contains an excess of sulphur trioxide. There are objections, however, to the use of sulphuric acid since the refining loss is often high due to oxidation, charring and the like, especially when strong acid is used on heavy oils. Oils treated in this manner are often dark in color and show considerable tendency to emulsify after finishing in the usual manner, for example by neutralizing with caustic soda with or without clay filtration.

I have discovered that petroleum oils may be efficiently purified by treatment with a mixture of sulphur trioxide and sulphur dioxide; that this method is not only more economical in respect to acid but also produces better oils in respect to color, odor, and the like. When treating heavier oils, such as lubricating oils, the product is found to be decidedly more resistant to emulsification than oils produced with concentrated acid in the usual manner. In the treatment of lubricating cuts for the production of white oils, the taste of the oil is much improved in addition to the other advantages above noted.

In the practice of my invention mineral oil is treated with a reagent comprising sulphur trioxide admixed with sulphur dioxide. Treatment is preferably carried out in a closed vessel with artificial cooling and means for agitation. The oil is preferably first put into the vessel and later the liquid mixture of sulphur trioxide and sulphur dioxide added. Temperature is generally maintained below that of the atmosphere, for example about −10° C. but higher temperature may be used, and in that case pressure sufficient to maintain sulphur dioxide in liquid phase is maintained. Low temperatures are preferable and heavy oils which have a high viscosity may be diluted with naphtha before treatment.

The composition of the treating reagent may be varied considerably according to the needs of the oil, but I have found that mixtures containing 10% of $SO_3$ or less may be used satisfactorily, although a larger proportion of sulphur trioxide is allowable. The treatment is preferably given in a plurality of successive treats, withdrawing the layer of sulphur dioxide and sludge after each treatment. If desired the reagent mixture may be used systematically in a countercurrent method of treating as will be understood. The treated oil may be finished in any known manner and the spent treating agent after separation from the oil may be heated to drive off sulphur dioxide which may be liquefied by compression and cooling and thereby recovered for reuse.

As an example of my process, a distillate having a specific gravity of .874 at 60° F. and viscosity of 93 seconds Saybolt at 100° F. is treated once with an equal volume of a mixture of sulphur trioxide and sulphur dioxide which contains about 10.0 gr. of $SO_3$ per litre. The $SO_3$ is in solution in the liquid sulphur dioxide. Temperature during treatment is maintained at about −10° C. and the mixture is agitated for about two hours. The sludge layer is then removed, the oil washed twice with an aqueous solvent containing 50% isopropyl alcohol, neutralized with soda, and filtered through active clay in proportion of about 108 barrels of oil per ton of clay.

On examination of the oil the gravity appears to be about the same. The viscosity is 101 Saybolt at 100° F. and color about 2¼ Robinson. The resistance to emulsification, (R. E.) according to the test described in Day's Handbook of the Petroleum Industry, vol. 1, page 696 et seq. is found to be 1.

As a comparison with the above test, a similar oil is treated with 2 batches each of 5% by volume of fuming sulphuric acid containing 20% $SO_3$ and the oil is finished as above. Color and odor appear to be about equally as good as the oil treated by my method, but it is much inferior in other respects, for example, resistance to emulsion which is 10 or more.

While my process is of particular value in the treatment of heavy cuts for the production of lubricating and white oils, it is also applicable to treatment of naphtha, kerosene and the like.

My invention is not to be limited to any theory of the mechanism of the process nor to any specific example given merely by way of illustration, but only by the following claims in which I wish to claim all novelty inherent in my invention.

I claim:

1. In a process for treatment of petroleum oils, the steps of agitating the oil with a reagent comprising a preformed liquid mixture of sulphur dioxide and sulphur trioxide, and separating the purified oil.

2. In a process for treatment of petroleum oil, the steps of agitating the oil in a closed vessel with a liquid mixture of sulphur dioxide and sulphur trioxide, settling and removing the sludge layer.

3. The process for purifying petroleum oils, comprising agitating the oil with a plurality of batches of a reagent, comprising liquid sulphur dioxide and sulphur trioxide.

4. The process of treating petroleum oils, comprising agitating the oil with a liquid mixture of sulphur dioxide and sulphur trioxide, settling the oil, removing the sludge, evaporating sulphur dioxide therefrom and liquefying the same for reuse.

5. In a process for treatment of petroleum oils the steps of agitating the oil with a solution of sulphur trioxide in liquid sulphur dioxide, and separating the purified oil.

6. Process according to claim 5, in which the oil and treating agent are maintained at a temperature of about $-10°$ C.

7. The process for manufacturing lubricating oils with high resistance to emulsification, comprising treating a lubricating cut with a mixture of liquid sulphur dioxide and sulphur trioxide, settling, withdrawing the oil, and finishing the same.

8. The process for manufacturing lubricating oils with high resistance to emulsification, comprising treating a lubricating distillate with a liquid mixture of sulphur dioxide and sulphur trioxide, separating oil from sludge formed by said treatment, and neutralizing the same.

KARL T. STEIK.